Dec. 30, 1924.
M. S. YOUNG
CHOCK BLOCK
Filed July 7, 1922
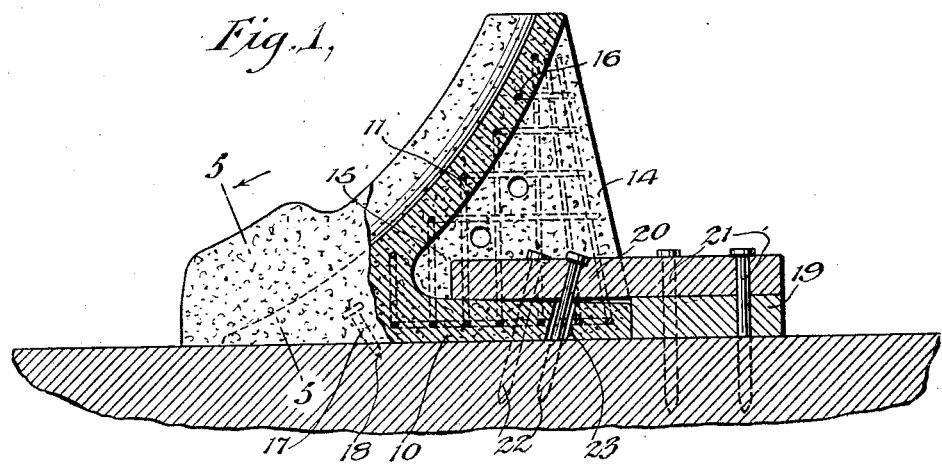
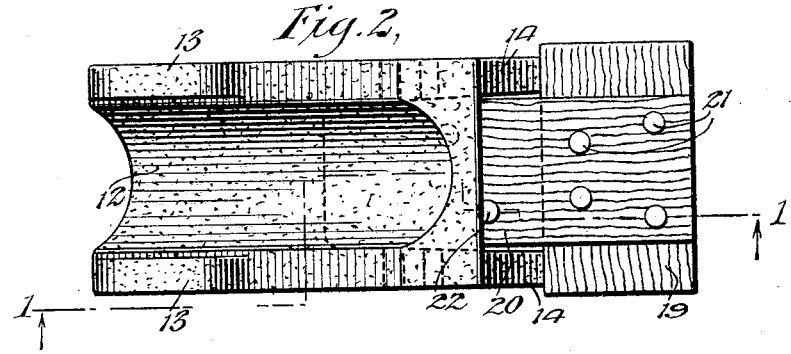
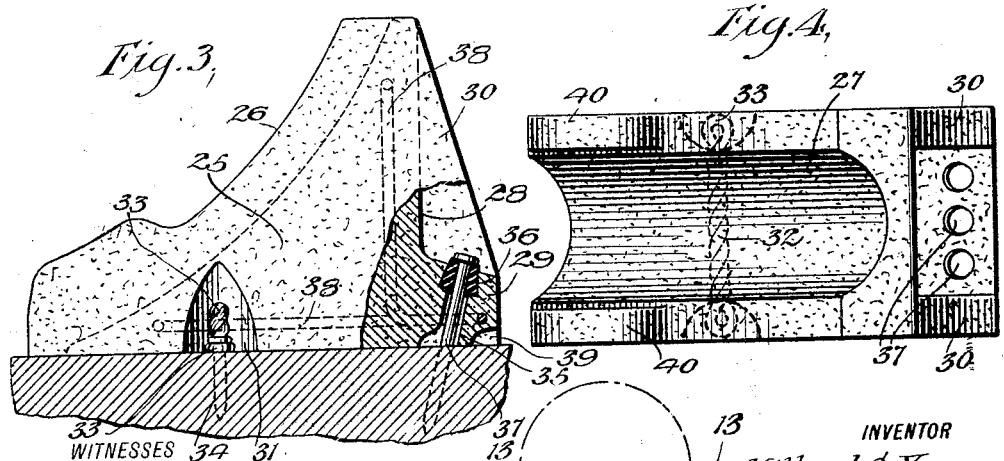
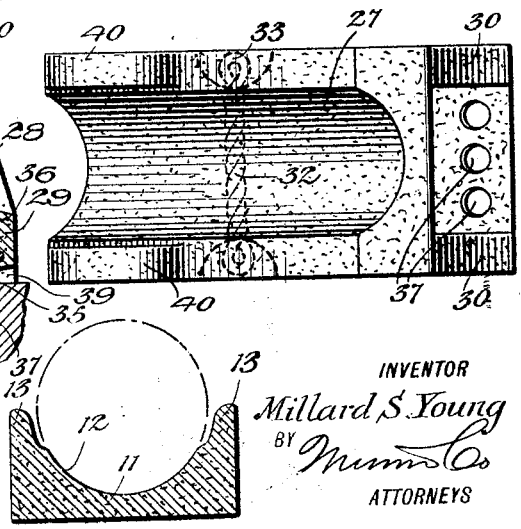
INVENTOR
Millard S. Young
BY
ATTORNEYS Patented Dec. 30, 1924.

UNITED STATES PATENT OFFICE.

MILLARD SOUTHWORTH YOUNG, OF FLINT, MICHIGAN.

CHOCK BLOCK.

Application filed July 7, 1922. Serial No. 573,299.

*To all whom it may concern:*

Be it known that I, MILLARD S. YOUNG, a citizen of the United States, and a resident of Flint, in the county of Genesee and State of Michigan, have invented a new and Improved Chock Block, of which the following is a full, clear, and exact description.

This invention relates to an improvement in chock blocks for chocking vehicle wheels and is especially designed for use in the shipping of automobiles.

It is the general practice to block automobile wheels while in transit by means of wooden chock blocks having one curved face to fit against and partially around the tire. These blocks are nailed to the floor of the freight car on both the forward and rearward sides of the tire to prevent the wheel rolling upon starting and stopping of the train. Most of the timber suitable for such blocks is found in the southern States or at other points distant from the automobile factories. It follows that considerable transportation cost must be added to the original cost of producing the blocks, making them rather expensive to the automobile manufacturer and ultimately to the purchaser. Furthermore the blocks being made from ground wood, check and crack so as to render them unfit for use if kept where they can dry out. Some attempts have been made to use sheet steel chock blocks, but these have been found very expensive and at present have not come into general use.

In order to overcome the above recited objections and disadvantages, the present invention has been devised for the purpose of producing a chock block which can be easily and cheaply cast or molded in forms or molds from materials which are easily obtainable everywhere and at a very low cost. While it is proposed to use in the present invention blocks constructed from concrete as ordinarily made from Portland cement, sand and gravel, it is to be understood that other materials capable of being molded or cast, while in a plastic or fluid state and having the property of hardening to a condition of strength suitable for the purpose, may be utilized.

Owing to the prohibitive cost of mill operations and the production of an article which must be sold so cheaply, as is the case with chock blocks, some desirable features must be omitted from wood and steel blocks which may be easily incorporated where said blocks are molded or cast, and this with very little if any additional cost. To illustrate this, the corners and edges where the curved face joins the adjacent surfaces may be well rounded on a cast or molded block, while on wood blocks these edges are left sharp. A disadvantage resulting from such a condition is evident where a wheel breaks loose from its hold down strap and jumps crosswise of the blocks thereby seriously cutting or chafing the tire. Furthermore the tire groove in the curved face must not be made too deep for fear that the sides of the tire will become chafed by the constant limited motion of the wheels between the blocks. Consequently the grooves are often made so shallow as to afford inadequate protection against "side sway" and it becomes necessary to nail side boards to the blocks to prevent the tire from swinging crosswise of the blocks.

In the present invention which contemplates a cast or molded block, it is possible at practically no additional cost to construct the same with a groove of two different radii whereby the depth of the groove is increased any desired amount and thereby in effect providing an additional side flange at each side of the groove for preventing the side swing of the wheel, and this without danger of chafing the sides of the tire. In employing wood and steel blocks, owing to their comparative lightness and the smoothness of their surfaces, practically no resistance is offered to the movement or slipping of the same upon the floor and as a result the entire shock loads must be borne by the nails which fasten the blocks to the floor and it is a general practice to drive the nails "toe nail fashion" through the side edges of the block well up toward the small end to resist the side shock. In the present invention by the employment of a cast or molded concrete block, not only is the base surface inherently rough owing to the fact that it is composed of sharp grains of sand, but it is further possible to embed nails in the concrete with the points projecting slightly from the base to act as spurs for engagement with the floor to retard the movement of the blocks both longitudinally and transversely. This relieves the nail fastening and clamping devices of a considerable amount of the shock loads which they would ordinarily be compelled to sustain unaided in the wood and steel block structures.

As a further object and advantage a cast or molded concrete block will not check or crack under any climatic condition, but will actually grow stronger with age and consequently unlike wood blocks they may be stored out of doors and kept indefinitely without insurance charges. Neither will rust attack them as is the case with steel blocks and painting is unnecessary.

With the above recited and other objects and advantages in view, the invention resides in the novel construction set forth in the following specification, particularly pointed out in the appended claims and illustrated in the accompanying drawings, it being understood that the right is reserved to embodiments other than those actually illustrated herein to the full extent indicated by the general meaning of the terms in which the claims are expressed.

In the drawings—

Figure 1 is a side elevation of a chock block constructed in accordance with the invention, parts being broken away and shown in section to disclose the underlying structure.

Fig. 2 is a plan view thereof.

Fig. 3 is a side elevation of a modified adaptation of the invention, parts being broken away to disclose the underlying structure.

Fig. 4 is a plan view thereof.

Fig. 5 is a sectional view taken approximately on the line 5—5 of Fig. 1.

Referring to the drawing by characters of reference, the chock block consists of a base 10 which is of substantially rectangular formation and is provided at one end with an upwardly curved or arcuate upstanding flange 11 provided on its outer face with a central curve 12, the radius of which corresponds approximately to the radius of the tread portion of an automobile tire so that said curve will snugly fit and accommodate the portion of the tread of a tire immediately adjacent its contact with the floor. The upwardly curved flange 11 is further provided with upwardly projecting side flanges 13, the inner peripheral faces of which are spaced relatively further apart or are struck on a larger radius than the groove. This affords an additional protection for the prevention of displacement of the wheel due to the side sway without danger of chafing of the sides of the tire. The block further includes side webs 14 which connect the end flange 11 with the base 10 to strengthen the structure and at the same time provide a pocket 15 for a purpose to be hereafter set forth. The block base 10 and end flange 11 may be further reinforced by a reinforcing network of wire 16 which is embedded therein during the casting or molding of the block. In order to provide means in addition to the inherent roughened surface of the base for preventing longitudinal or transverse slipping of the block on the floor, short nails 17 may be embedded in the block with their pointed extremities 18 projecting therefrom to constitute spurs. Clamping blocks or cleats 19 may be employed for securing the chock blocks to the floor of the car, said cleats having projecting extremities 20 which are adapted to be received by the pocket 15 and overlie the base 10. The cleats are preferably secured to the floor by nails, screws or other fastening elements 21 while the extensions 20 are secured to the chock blocks by nails, screws or other fastening elements 22 which are driven toe-nail fashion through the extensions and through the apertures 23 formed in the base 10 for such a purpose. In the modified adaptation of the invention illustrated in Figs. 3 and 4 the chock block consists of a body 25 having an upwardly curved or arcuate end 26 formed with a central groove 27 which is of a size and configuration to snugly embrace a portion of the tread of a tire. In this instance the opposite end of the body 25 is provided with a vertical surface 28 having an extension 29. Parallel spaced side webs 30 are provided which connect the body with the extension to brace and strengthen the structure. The side walls of the body 25 are provided with recesses 31 and a transversely disposed twisted reinforcing element 32 is embedded in the body 25 with the opposite extremities thereof formed into eyes 33 which extend into the recesses 31 to receive fastening elements 34 adapted to be driven and anchored into the floor. The extension 29 is provided with inclined apertures 35 extending therethrough which have embedded in their upper ends bushings 36 of a soft yieldable material such as wood, lead, leather, or the like. The lower end of said apertures are enlarged in a forward direction for a slight distance above the lower face of base to provide recesses into which the nails or screws may bend if the block should be displaced rearwardly by shock. Otherwise the nails or screws would be liable to shear at the floor line. The upper faces of said bushings extend above the upper face of the extension to protect the same from damage by the hammering operation in driving the fastening nails 37 home. Additional reinforcing wires 38 may also be embedded in the body 25 and the outer end of the extension 29 is provided at its lower edge with a rabbeted portion 39 within which a crowbar may be inserted for detaching the chock block from the floor. The curved face 26 of the chock block is provided with side flanges 40 similar to the flanges 13 and for a like purpose.

I claim:

1. In combination with an automobile chock block having a curved face conforming approximately to the configuration of a segmental portion of an automobile tire, a base and side walls forming a recess partially enclosed thereby, said base having apertures formed therein for the reception of fastening elements, and means for clamping said block to the vehicle support for resisting the transverse and lateral thrusts imparted thereto.

2. In combination with an automobile chock block consisting of a portion having a curved face conforming approximately to the configuration of a segmental portion of the tire, a base, and a connection between said base and the curved face portion and extended side flanges formed on said curved face portion having a radius greater than the cross sectional radius of the tire.

3. A chock block for vehicle wheels comprising a base, arcuate upstanding side flanges formed on said base adapted to receive therebetween the tread of a vehicle wheel, upwardly projecting flanges formed on said first flanges and spaced relatively further apart than said first flanges, side webs connecting said first flanges with the base and providing a pocket at the rear of the block, and means for attaching the block to a floor secured within said pocket.

MILLARD SOUTHWORTH YOUNG.